(12) United States Patent
Yu et al.

(10) Patent No.: US 6,541,142 B1
(45) Date of Patent: Apr. 1, 2003

(54) FUEL CELL SYSTEM HAVING A METHANOL DECOMPOSITION REACTOR

(75) Inventors: Paul Taichiang Yu, Pittsford, NY (US); William Henry Pettit, Rochester, NY (US); Gerald Voecks, Fairport, NY (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/678,720

(22) Filed: Oct. 4, 2000

(51) Int. Cl.[7] .............................. H01M 8/04; H01M 8/06
(52) U.S. Cl. .............................. 429/17; 429/20; 429/24; 429/26
(58) Field of Search .............................. 429/17, 19, 20, 429/26, 22–24

(56) References Cited

U.S. PATENT DOCUMENTS

| | | | | |
|---|---|---|---|---|
| 4,098,960 A | * | 7/1978 | Gagnon | 429/23 |
| 5,961,928 A | * | 10/1999 | Maston et al. | 422/105 |
| 6,077,620 A | * | 6/2000 | Pettit | 429/17 |
| 6,231,831 B1 | * | 5/2001 | Autenrieth et al. | 422/180 |

FOREIGN PATENT DOCUMENTS

| JP | 08-078039 | * | 3/1996 |
|---|---|---|---|

* cited by examiner

*Primary Examiner*—Carol Chaney
*Assistant Examiner*—Susy Tsang-Foster
(74) *Attorney, Agent, or Firm*—Cary W. Brooks

(57) ABSTRACT

A fuel cell system having a methanol decomposition reactor that is used to solve cold startup and transient operating condition problems. Methanol is charged into a methanol decomposition reactor and heat is supplied to decompose methanol (an endothermic reaction) and to produce hydrogen molecules and carbon monoxide. Hot exhaust gas (effluent) from the methanol decomposition reactor is charged to a steam reformer to preheat the reformer. The hydrogen produced by methanol decomposition is used by a fuel cell stack.

34 Claims, 1 Drawing Sheet

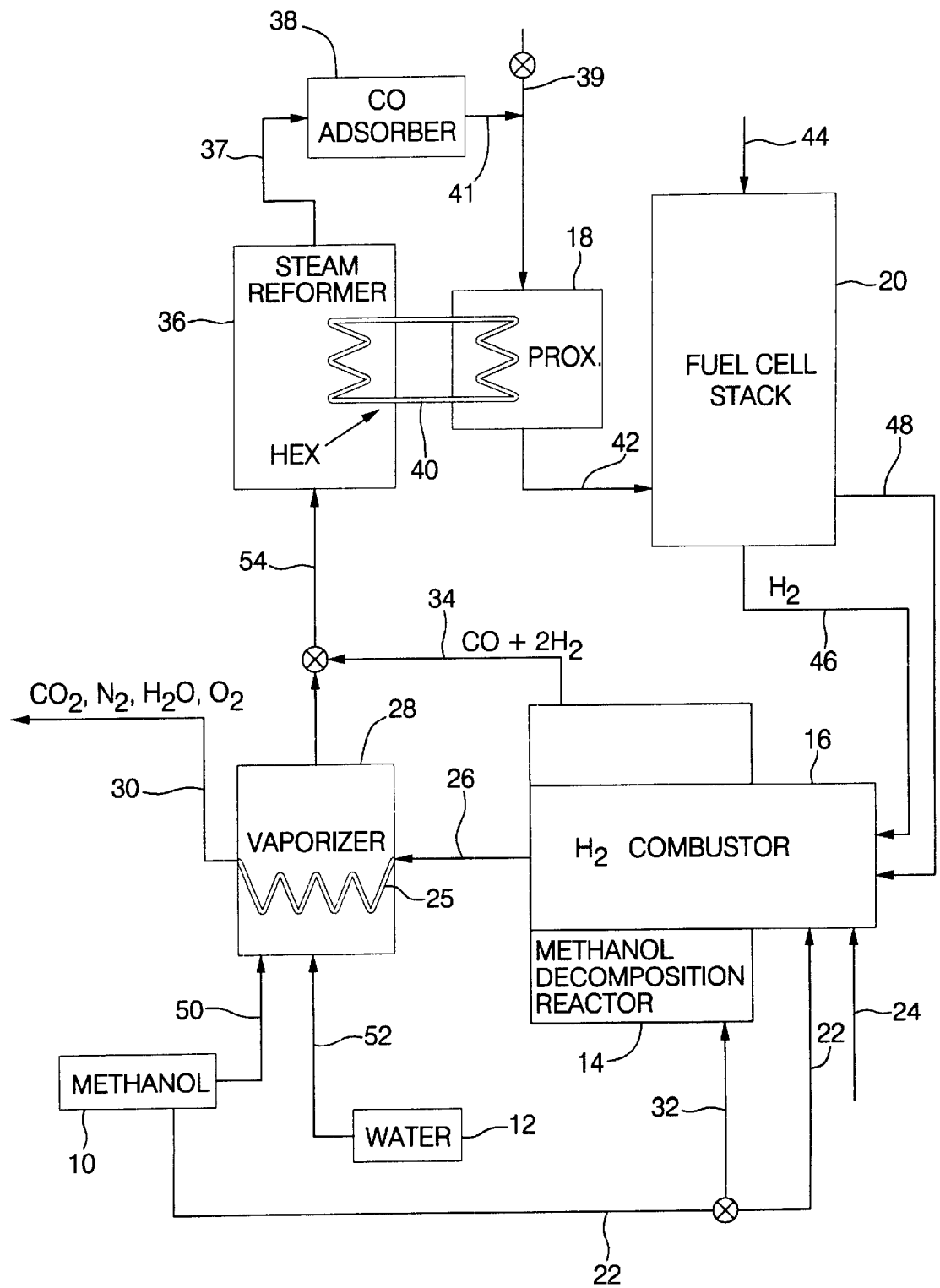

FUEL CELL SYSTEM HAVING A METHANOL DECOMPOSITION REACTOR

TECHNICAL FIELD

This invention relates to a fuel cell system having two hydrogen generating reactors.

BACKGROUND OF THE INVENTION

This invention solves problems associated with the cold startup of a fuel cell system and problems associated with transient operating conditions. The following brief discussion of fuel cell system components and their operation will provide a background for understanding the problems facing the inventors of the present invention.

A primary advantage of a fuel cell is that a fuel cell can convert stored energy to electricity with about 60–70 percent efficiency, with higher efficiencies theoretically possible. Further, fuel cells produce virtually no pollution. These advantages make fuel cells particularly suitable for vehicle propulsion applications and make fuel cells a potential replacement for the internal combustion engine which operates at a less than 30 percent efficiency and can produce undesirable emissions.

A fuel cell principally operates by oxidizing an element, compound or molecule (that is, chemically combining with oxygen) to release electrical and thermal energy. Thus, fuel cells operate by the simple chemical reaction between two materials such as a fuel and an oxidant. Today, there are a variety of fuel cell operating designs that use many different fuel and oxidant combinations. However, the most common fuel/oxidant combination is hydrogen and oxygen (usually in the form of air).

In a typical fuel cell, hydrogen is burned by reacting the hydrogen with oxygen (from air) to produce water, electrical energy and heat. This is accomplished by feeding the hydrogen over a first electrode (anode), and feeding the oxygen over a second electrode (cathode). The two electrodes are separated by an electrolyte which is a material that allows charged molecules or "ions" to move through the electrolyte. There are several different types of electrolytes that can be utilized including the acid-type, alkaline-type, molten-carbonate-type and solid-oxide-type. The so-called PEM (proton exchange membrane) electrolyte (also known as a solid polymer electrolyte) are of the acid-type, and potentially have high-power and low-voltage, and thus are desirable for vehicle applications.

Although compressed or liquefied hydrogen could be used to operate a fuel cell in a vehicle, to date this is not practical. The use of compressed or liquefied hydrogen ignores the extensive supply infrastructure currently being used to supplying gasoline for internal combustion engine automobiles and trucks. Consequently, it is more desirable to utilize a fuel source such as methanol, gasoline, diesel, etc., to provide a hydrogen source for the fuel cell. However, the methanol, gasoline, diesel, etc., must be reformed to provide a hydrogen gas source. This is accomplished by using fuel processing equipment and hydrogen cleanup or purification equipment.

Fuel cell systems often include a fuel processing section which reforms a fuel, preferably an organic fuel such as methanol, gasoline, diesel, etc., to produce hydrogen and a variety of other byproducts. In post startup operation conditions, water and a fuel are delivered to a vaporizer and vaporized prior to charging the water/fuel vaporized stream into the reformer. However, the reforming process is endothermic and requires heat input to drive the reforming reaction. Under cold startup conditions, the reformer is cold and will not reform the fuel charged into the reformer. If steam is charged into the reformer when the reformer is cold, the steam will condense and may damage the catalyst in the steam reformer. Further, in cold weather situations, water can freeze and damage the catalyst, particularly if a pellet catalyst is used in the reformer.

The steam reformers currently being contemplated for vehicle propulsion have a substantial mass associated with the supported catalyst used to reform fuel such as methanol, gasoline, diesel, etc. Consequently, due to the large mass associated with the supported catalyst, the steam reformers take an unacceptable time to heat up to their operating temperature of about 200–300 degrees Celsius for methanol reforming, 600–800 degrees Celsius for gasoline reforming, etc. In the past, both catalytic combustors and direct fire combustors have been utilize to heat up steam reformers during cold start conditions. However, these combustors can reach very high temperature in a short period of time. This can be very problematic for methanol steam reforming which uses catalyst such as the copper-zinc that can be damaged upon exposure to elevated temperatures above 300 degrees Celsius. Thus, a quick cold startup system for methanol steam reforming has heretofore been unavailable. Other methods of quick startup would require advanced insulation technologies, and potential off-cycle pilot or electric heating.

Additional problems are associated with transient operating conditions of a fuel cell. During transient operating conditions a dramatic change in the electrical load demand on the fuel cell stack occurs. For example, a dramatic change in electrical load occurs when an operator of a vehicle attempts to accelerate the vehicle from a stopped position. The reformation process does not produce a sufficient amount of hydrogen quickly enough to meet the change in the electrical load.

Thus it would be desirable to provide a fuel cell system that avoids the problems associated with cold startup of the reformer and transient operating conditions of the fuel cell system. The present invention overcomes several of the deficiencies of the prior art.

SUMMARY OF THE INVENTION

The invention includes a fuel cell system having a methanol decomposition reactor that is used to solve cold startup and transient operating condition problems. Methanol is charged into a methanol decomposition reactor and heat is supplied to decompose methanol (an endothermic reaction) to produce hydrogen molecules and carbon monoxide. Hot exhaust gas from the methanol decomposition reactor is charged to a fuel reformer to preheat the reformer. Preheating the reformer with the hot exhaust gas from the methanol decomposition reactor brings the steam reformer up to a suitable operating temperature. Once the steam reformer is at a suitable operating temperature, methanol and water can be charged into the steam reformer without the water freezing and damaging the catalyst in the steam reformer. Further, the methanol decomposition reactor has a quick response time, relative to the steam reformer, and quickly provides a stream of hydrogen for operating the fuel cell when the system is cold.

The methanol decomposition reactor can be used to meet high load demands in transient operation of fuel cell system. Methanol can be charged to the methanol decomposition reactor when a relatively high load is required by the fuel cell stack, for example after a turndown situation. The methanol decomposition response time is relatively quick and almost instantly produces a stream of hydrogen for use by the fuel cell stack to meet a rapid change in electrical load requirements. However, because the hydrogen production efficiency of the methanol decomposition reactor is less than that of the steam reformer, it is desirable to utilize only the steam reformer after the methanol decomposition reactor has met a rapid electrical load change requirement.

In a preferred embodiment, the steam reformer can also be operated as a water gas shift reactor during cold startup conditions. Warm water, preferably from a preferential oxidation reactor downstream, can be supplied to the steam reformer to shift the equilibrium concentration of carbon monoxide in the reformer.

Another embodiment of the invention includes a fuel cell system having two hydrogen generating reactors. The first hydrogen generating reactor (e.g., a methanol decomposition reactor) is operated during cold startup conditions. A second hydrogen generating reactor (e.g., a methanol steam reforming reactor) is provided but requires heat input to reach a predetermined operating temperature above that of the cold startup temperature. During a cold startup situation, the first hydrogen generating reactor is operated to produce a hydrogen stream (A) and hot exhaust gas from the first reactor. The second hydrogen generating reactor is constructed and arranged to, after reaching a predetermined operating condition, produce a hydrogen stream for use by a fuel cell stack. The second hydrogen generating reactor is heated using the hot exhaust gas from the first reactor, while a fuel cell stack is operated utilizing the hydrogen stream (A) from the first hydrogen generating reactor. After the second hydrogen generating reactor has reached a predetermined operating temperature, it is operated to produce a hydrogen stream (B) for use by the fuel cell stack and the operation of the first hydrogen generating reactor is stopped.

Another embodiment of the invention includes a method of operating a fuel cell system during transient operating conditions wherein the electrical load demand on the fuel cell stack is dramatically increased. First and second hydrogen generating reactors are provided wherein the first hydrogen generating reactor (e.g., a methanol decomposition reactor) has a lesser hydrogen producing efficiency than that of the second hydrogen generating reactor (e.g., a methanol steam reforming reactor). The first hydrogen generating reactor also has a faster response time for producing hydrogen on demand than the second hydrogen generating reactor. Upon a dramatic increase in the load demand on the fuel cell stack, such as when an operator of a vehicle at a stopped position attempts to accelerate the vehicle, the first hydrogen generating reactor is operated to produce a hydrogen stream (A) for use by the fuel cell stack. After the dramatic increase in the electrical load demand has been met, the first hydrogen generating reactor is stopped. The second hydrogen generating reactor is operated to provide a hydrogen stream (B) for use by a fuel cell stack during ongoing normal operating conditions.

According to the present invention, heat for the endothermic decomposition of methanol may be supplied from any of a variety of heat generating components in the fuel cell system, including a catalytic combustor or a preferential oxidation reactor.

In a preferred embodiment, a catalytic combustor is utilized to provide heat to vaporize cold water and methanol during cold startup conditions. After the vaporizer has been heated by the catalytic combustor and the steam reformer has been heated by the methanol decomposition exhaust gas, methanol and water can be charged into the steam reformer. Temperature sensors may be located in the vaporizer and steam reformer to determine when it is no longer necessary to charge methanol into the methanol decomposition reactor.

These and other objects, features and advantages of the present invention will be apparent from the following brief description of the drawings, detailed description of preferred embodiments, and appended claims and drawings.

BRIEF DESCRIPTION OF THE DRAWING

FIG. 1 is a schematic illustrating an embodiment of the present invention and its components, along with their connectivity and the process flow for a fuel cell system.

DESCRIPTION OF THE PREFERRED EMBODIMENT

FIG. 1 is a schematic drawing of one embodiment of a fuel cell system illustrating fuel cell system components and a process flow according to the present invention. The fuel cell system includes a methanol holding tank 10 and water holding tank 12. A methanol decomposition reactor 14 is provided and includes a catalyst (not shown) therein for decomposing methanol. The term "methanol decomposition" as used herein means (consistent with its ordinary meaning) the structural breakdown of methanol into its simpler molecules and/or atoms; as compared to "chemical combustion" which is a process that introduces oxygen to oxidizing (burn) a compound or molecule; or as compared to a "reaction of multiple reactants" wherein multiple reactants react to make one or more chemical products.

Examples of a suitable methanol decomposition catalyst includes palladium, platinum, etc. The catalyst may be deposited or carried in the methanol decomposition reactor on any of a variety of substrates or supports. Preferably a palladium catalyst is carried on a metal oxide support such as $ZrO_2$, $Pr_2O_3$, and $CeO_2$. Most preferably, 10–20 weight percent palladium on a metal oxide such as $ZrO_2$ is particularly suitable for methanol decomposition at low temperatures. Palladium catalyst on these supports are significantly active at 200–300 degrees Celsius. Furthermore, palladium and platinum catalyst can withstand temperatures of 500–600 degrees Celsius and above without damage to the catalyst. Catalyst on these supports can be prepared by any of a variety of methods known to those skilled in the art including coprecipitation and impregnation methods. For example, suitable methanol decomposition catalyst on supports and methods of making the same is disclosed in Usami et al "Catalytic Methanol Decomposition at Low Temperatures over Palladium Supported on Metal Oxide" Applied Catalysis A: General 171 (1998) 123–130, the disclosure of which is hereby incorporated by reference.

In the methanol decomposition reaction, methanol is broken down into carbon monoxide and hydrogen molecules. However, methanol decomposition is an endothermic reaction. Accordingly, heat must be supplied to the methanol decomposition reactor from a heat generating fuel cell system component. Suitable heat generating fuel cell components include a flame or catalytic combustor 16, preferential oxidation reactor 18, or even a fuel cell stack 20. Preferably, a catalytic combustor 16 is utilized as the heat generating component and the methanol decomposition reactor 14 is positioned as a sleeve surrounding at least a portion of the catalytic combustor 16. The catalytic combustor 16 can quickly raise the temperature of the methanol decomposition catalyst to the 200–300 degrees Celsius range, and even to the 500–600 degrees Celsius range.

The term "cold startup" as used herein refers to a condition in which the fuel cell system is started prior to the fuel cell components reaching their optimal or standard operating temperature. In particular, the term "cold startup" is used to refer to a condition in which the steam reformer of the fuel cell system is at a temperature outside of a preferred (normal operating) range of about 200–300 degrees Celsius. More particularly, the term "cold startup" may include a situation in which the steam reformer has an internal temperature ranging from −40 to less than 200 degrees Celsius, for example within the temperature range of −25 to 180, or −25 to 150 degrees Celsius.

During a cold startup, a fuel such as methanol is delivered to the catalytic combustor 16 via line 22, along with an oxidant such as air through line 24. The methanol and air are charged into the catalytic combustor 16 for a few minutes, until excess hydrogen and excess oxygen streams are available from the fuel cell stack 20 that can be burned in the catalytic combustor. A combustion catalyst is carried on a suitable support in the combustor 16 for oxidizing the methanol at initial startup, and thereafter for combusting hydrogen from the fuel cell stack 20. The catalytic combustor exhaust is delivered via line 26 to a heat exchanger 25 in a vaporizer 28 to warm up the contents of the vaporizer 28. The catalytic combustion exhaust is then discharged to the atmosphere via line 30. Some systems may utilize low grade combustion exhaust heat for other purposes such as heating stack coolant on startup.

Once the methanol decomposition reactor 14 reaches an operating reaction temperature of about 200–300 degrees Celsius, methanol is injected into the methanol decomposition reactor 14 via line 32. The heat from the catalytic combustor is used to decompose the methanol, charged into the methanol decomposition reactor, in the presence of a decomposition catalyst such as palladium, platinum, etc. The hot effluent from the decomposition reactor, which includes CO and hydrogen, is delivered via line 34 to a steam reformer 36. The hot methanol decomposition reactor effluent helps to heat up the steam reformer 36 and the reformer catalyst, such as, for example, copper-zinc, carried therein. The hot methanol decomposition reactor effluent is substantially free of water vapor and can be flowed through the cold methanol steam reforming catalyst bed (not shown) in the steam reformer 36 to preheat the catalyst bed without any water condensation. This configuration (or process design) overcomes prior art water condensation problems that occur during cold startup and which often caused damage to the catalyst bed in the steam reformer.

The steam reformer 36 is used to reform an organic fuel such as methanol, gasoline, diesel, etc., but preferably methanol. Preferably the effluent 37 from the reformer is sent through a hydrogen purification section of the fuel cell system. This hydrogen purification section may include a CO adsorber 38 and a preferential oxidation reactor 18 to remove CO produced either by the steam reforming of a fuel such as methanol, or which is produced by the methanol decomposition reaction. An oxidant such as air may be added, via line 39, to the CO adsorber effluent 41 prior to entry into the preferential oxidation reactor 18 (PrOx). A heat exchanger mechanism 40 may be provided to transfer heat generated by the preferential oxidation reactor (PrOx) 18 to the steam reformer 36. The effluent 42 from the preferential oxidation reactor 18 includes a small amount of CO (<10 ppm) and a high concentration of hydrogen molecules. The high concentration hydrogen stream is delivered via line 42 to a fuel cell stack 20 in excess of the stoichiometric amount required by the fuel cell stack. An oxidant such as air is also delivered, in excess, to the fuel cell stack 20 via line 44. The fuel cell stack 20 operates in a manner known to those skilled in the art. A suitable fuel cell stack and its operation is disclosed in U.S. patent application Ser. No. 09/669,969 filed Sep. 26, 2000, by William Pettit et al, entitled "Multistage Combustion Process to Maintain a Controllable Reformation Temperature Profile" the disclosure of which is hereby incorporated by reference and assigned to the assignee of the present invention.

Excess hydrogen that is not used by the fuel cell stack 20 may be delivered to the catalytic combustor 16 via line 46. Likewise, excess oxidant (air) that is not used by the fuel cell stack 20 may be delivered to the catalytic combustor via line 48. The hydrogen and air are burned in the catalytic combustor 16 when the fuel cell system has reached post startup or normal operating temperatures.

Once the vaporizer 28 and steam reformer 36 have reached a predetermined operating temperature (200–300 degrees Celsius for the methanol steam reformer), methanol is delivered from the fuel tank 10 via line 50 to a vaporizer 28. At the same time, water is delivered from a water tank 12 via line 52 to the vaporizer. The water and methanol are vaporized and then delivered to the steam reformer via line 54. Once the steam reformer 36 has reached a predetermined operating temperature, the methanol decomposition reaction can be stopped in favor of the more efficient methanol steam reforming process.

In a preferred embodiment, the catalytic combustor 16 is utilize to provide heat through the heat exchanger 25 to vaporize cold water and methanol during cold startup conditions. After the vaporizer 28 has been heated by the catalytic combustor 16 and the steam reformer 36 has been heated by the methanol decomposition effluent and preferential oxidation reactor, methanol and water vapor can be charged into the steam reformer 36. Temperature sensors (not shown) may be located in the vaporizer 28 and in the steam reformer 36 to determine when these components have reached normal operating temperatures and wherein it is no longer necessary to charge methanol into the methanol decomposition reactor 14 in order to produce hydrogen by methanol decomposition and to transfer heat.

In another embodiment of the invention, methanol decomposition reactor 14 may be utilized to solve transient operating load problems. Under some operating conditions, the response time of the vaporizer 28 and steam reformer 36 may not be quick enough to generate hydrogen in a sufficient amount to satisfy large load demand changes on the fuel cell stack 20. In a turndown condition, the load on the fuel cell stack has been dramatically reduced (for example, when a car comes to a stop at a traffic light). Thereafter, the load on the fuel cell stack may be dramatically increased (for example when the vehicle operator attempts to quickly accelerate from a stop). Under such conditions, methanol may be charged into the methanol decomposition reactor and decomposed to quickly generate an additional hydrogen rich stream to help meet the load demand on the fuel cell stack. However, ongoing operation of the methanol decomposition reactor is not desirable because the methanol decomposition reactor has a lower hydrogen conversion efficiency than the steam reformer. The water used in the steam reforming process is an additional source of hydrogen that makes the steam reformer process more efficient in producing hydrogen than the methanol decomposition reaction.

Naturally the fuel cell system may include an automated process control system that controls the various fuel cell components such as the vaporizer, steam reformer, carbon monoxide adsorber, PrOx, fuel cell stack, combustor, methanol decomposition reactor, and associated pumps, valves, heat exchangers, sensors, and electrical equipment. Associated outboard computer controllers, drivers, actuators, sensors and associated electrical/electronic equipment may be provided to control the above described process components and processes in a manner known to those skilled in the art.

From the forgoing it will be appreciated that the use of the methanol decomposition reactor in the fuel cell system allows the methanol to be charged into the decomposition reactor to produce a hot exhaust gas stream that is used to heat the steam reformer during a cold startup situation. A hydrogen rich stream is almost immediately supplied by the decomposition of methanol and can be used by the fuel cell stack to generate electricity. The methanol decomposition reactor can also be used in transient operating conditions wherein a relatively high electrical load demand is applied to the fuel cell system. Again, the decomposition of methanol quickly produces an additional hydrogen rich stream that can be used by the fuel cell stack to more quickly accommodate rapid changes in load demand.

What is claimed is:

1. A fuel cell system comprising:
    a fuel cell stack constructed and arranged to utilize hydrogen to produce electricity,
    a steam reformer for reforming an organic fuel and producing hydrogen for use by the fuel cell stack,
    a methanol decomposition reactor for decomposing methanol and producing hydrogen and hot exhaust gases,
    the methanol decomposition reactor being operatively connected to the steam reformer to deliver hot exhaust gases from the methanol decomposition reactor to preheat the steam reformer, and
    the methanol decomposition reactor being operatively connected to the fuel cell stack to deliver hydrogen to the fuel cell stack.

2. A fuel cell system as set forth in claim 1 further comprising a combustor operatively connected to the methanol decomposition reactor to deliver heat to the methanol decomposition reactor and to drive a methanol decomposition reaction occurring in the methanol decomposition reactor.

3. A fuel cell system as set forth in claim 2 wherein the combustor comprises a catalyst for chemically combusting a combustible fuel.

4. A fuel cell system as set forth in claim 3 wherein the organic fuel comprises methanol.

5. A fuel cell system as set forth in claim 3 wherein the organic fuel comprises gasoline.

6. A fuel cell system as set forth in claim 3 wherein the methanol decomposition reactor comprises a sleeve overlying an outer surface of the combustor, and wherein a methanol decomposition catalyst is carried in the sleeve.

7. A fuel cell system as set forth in claim 1 further comprising a decomposition catalyst in the methanol decomposition reactor.

8. A fuel cell system as set forth in claim 7 wherein the decomposition catalyst comprises palladium.

9. A fuel cell system as set forth in claim 7 wherein the decomposition catalyst comprises palladium on a metal oxide support.

10. A fuel cells system as set forth in claim 7 wherein the decomposition catalyst comprises about 10–20 weight percent palladium on a metal oxide support, and wherein the support comprises at least one selected from the group consisting of $ZrO_2$, $Pr_2O_3$, and $CeO_2$.

11. A fuel cell system as set forth in claim 6 wherein the decomposition catalyst comprises about 10–20 weight percent palladium on a metal oxide support comprising $ZrO_2$.

12. A fuel cell system as set forth in claim 6 wherein the decomposition catalyst comprises platinum.

13. A fuel cell system as set forth in claim 8 wherein the steam reformer includes a catalyst comprising copper and zinc.

14. A fuel cell system as set forth in claim 12 wherein the steam reformer includes a catalyst comprising copper and zinc.

15. A fuel cell system as set forth in claim 2 wherein the fuel cell stack is operatively connected to the combustor to charging excess hydrogen and excess oxygen from the fuel cell stack into the combustor to be catalytically combusted to produce heat.

16. A fuel cell system as set forth in claim 15 further comprising a vaporizer and wherein the combustor is operatively connected to the vaporizer to heat the vaporizer using hot exhaust gases produced by the combustor.

17. A fuel cell system as set forth in claim 1 further comprising a carbon monoxide adsorber down stream of the reformer.

18. A fuel cell system as set forth in claim 1 further comprising a preferential oxidation reactor down stream of the reformer.

19. A fuel cell system as set forth in claim 18 wherein the preferential oxidation reactor is operatively connected to the reformer to the transfer heat generated by the preferential oxidation reactor to the reformer.

20. A method of operating a fuel cell system having a steam reformer, a methanol decomposition reactor and a heat generating component, comprising:
    operating a heat generating component to produce heat and supplying the heat to the methanol decomposition reactor when the steam reformer has an internal temperature below 200 degrees Celsius,
    charging methanol into a methanol decomposition reactor to decompose the methanol using heat supplied by the heat generating component and to produce a hot effluent stream from the methanol decomposition reactor comprising hydrogen,
    directing the hot effluent stream from the methanol decomposition reactor through the steam reformer to heat the steam reformer, and
    delivering hydrogen produced by the methanol decomposition reactor to the fuel cell stack.

21. A method as set forth in claim 20 wherein the heat generating component comprises a combustor.

22. A method as set forth in claim 21 wherein the combustor comprises a catalyst for catalytically combusting a fuel.

23. A method a set forth in claim 22 further comprising charging methanol into the combustor and catalytically combusting the methanol.

24. A method of operating a fuel cell system to meet rapid changes in electrical load demand and wherein the fuel cell system includes a fuel cell stack, a heat generating component, and a methanol decomposition reactor, comprising:
    operating a first hydrogen generating reactor to produce a first stream of hydrogen and delivering the first stream of hydrogen to a fuel cell stack,
    operating a heat generating component to produce heat upon a rapid increase in the electrical load demand on the fuel cell stack, charging methanol into a methanol decomposition reactor to decompose the methanol using the heat generated by the heat generating component and to produce a second stream of hydrogen, and delivering the second stream of hydrogen to the fuel cell stack.

25. A method as set forth in claim 24 wherein the heat generating component comprises a combustor.

26. A method as set forth in claim 25 wherein the combustor comprises a catalyst for catalytically combusting a fuel.

27. A method as set forth in claim 26 further comprising charging methanol into the combustor to combust the methanol and produce heat.

28. A method as set forth in claim 26 further comprising charging excess hydrogen and excess oxygen from the fuel cell stack into the combustor to be catalytically combusted and to produce heat.

29. A method as set forth in claim 26 further comprising heating a vaporizer using hot exhaust gases produced by the combustor.

30. A method of operating fuel cell system comprising:

providing a first hydrogen generating reactor operable during cold startup conditions, and providing a second hydrogen generating reactor requiring heat input to reach a predetermined operating temperature above the cold startup temperature, the second hydrogen generating reactor being constructed and arranged to, after reaching the predetermined operating temperature, producing a hydrogen stream (B) for use by the fuel cell stack, operating a first hydrogen generating reactor to produce a hydrogen stream (A) and hot exhaust gas from the first reactor, heating the second hydrogen generating reactor using the hot exhaust gas from the first reactor, and operating a fuel cell stack utilizing the hydrogen stream (A) from the first hydrogen generating reactor, and after the second hydrogen generating reactor has reached the predetermined operating temperature, stopping the operation of the first hydrogen generating reactor.

31. A method of operating a fuel cell system as set forth in claim 30 wherein the predetermined operating temperature of the second hydrogen generating reactor ranges from about 200 to about 300 degrees Celsius, and the temperature of the first hydrogen generating reactor at cold startup ranges from about −40 to about 180 degrees Celsius.

32. A method of operating a fuel cell system as set forth in claim 30 wherein the predetermined operating temperature of the second hydrogen generating reactor is about 200 degrees Celsius or greater, and the temperature of the first hydrogen generating reactor is less than 200 degrees Celsius at cold startup.

33. A method of operating a fuel cell system during transient operating conditions wherein the electrical load demand on a fuel cell stack is dramatically increased, comprising:

providing a first and a second hydrogen generating reactor, and wherein the first hydrogen generating reactor comprises a methanol decomposition reactor, operating the second hydrogen generating reactor to provide a hydrogen stream (B) for use by a fuel cell stack, and upon a dramatic increase in the electrical load demand on the fuel cell stack, operating the first hydrogen generating reactor to produce an additional hydrogen stream (A) for use by the fuel cell stack by decomposing methanol therein without the use of additional reactants; and after the dramatic increase in electrical load demand has been met, stopping the operation of the first hydrogen generating reactor.

34. A method of operating a fuel cell system as set forth in claim 33 wherein the first hydrogen generating reactor has lesser hydrogen producing efficiency than the second hydrogen generating reactor, and wherein the first hydrogen generating reactor has a faster response time for producing hydrogen than the second hydrogen generating reactor.

* * * * *